United States Patent
Sasaki et al.

[11] Patent Number: 5,381,161
[45] Date of Patent: Jan. 10, 1995

[54] DATA PROCESSING APPARATUS

[75] Inventors: Ryoichi Sasaki; Akihiro Furukawa, both of Nagoya, Japan

[73] Assignee: Brother Kogyo Kabushiki Kaisha, Nagoya, Japan

[21] Appl. No.: 217,130

[22] Filed: Mar. 24, 1994

Related U.S. Application Data

[63] Continuation of Ser. No. 978,757, Nov. 19, 1992, abandoned.

[30] Foreign Application Priority Data

Feb. 10, 1992 [JP] Japan .................. 4-023687

[51] Int. Cl.6 .............................. G09G 3/00
[52] U.S. Cl. ...................... 345/212; 345/211; 364/707; 365/227
[58] Field of Search ............ 364/707; 345/211, 212; 365/227

[56] References Cited

U.S. PATENT DOCUMENTS

| | | | |
|---|---|---|---|
| 3,932,846 | 1/1976 | Brixey et al. | |
| 4,317,181 | 2/1982 | Teza et al. | 364/707 |
| 4,559,614 | 12/1985 | Peek et al. | 345/141 |
| 5,065,357 | 11/1991 | Shiraishi et al. | 364/707 |

FOREIGN PATENT DOCUMENTS 62-22630 2/1987 Japan .

Primary Examiner—Ulysses Weldon
Assistant Examiner—Vivian W. Chang
Attorney, Agent, or Firm—Oliff & Berridge

[57] ABSTRACT

When the driving process of a floppy disk drive is operated, the back light is turned off to conserve energy according to a control process. The back light is also controlled when the disk drive is driven at intervals with short stop periods to light only after a determined interval of time elapses to prevent blinking of the back light while the disk drive is driven.

18 Claims, 7 Drawing Sheets

| S301 | BACK LIGHT ON REQUESTED? |
|---|---|
| S302 | DELAY TIMER 0? |
| S303 | BACK LIGHT ON |
| S304 | ANY KEY INPUT? |
| S305 | KEY INPUT TIMER 0? |
| S306 | BACK LIGHT OFF |
| S307 | BACK LIGHT SETTING KEY OPERATED? |
| S308 | LIGHTING OFF MODE? |
| S309 | SET IN BACK LIGHT TURNING OFF MODE |
| S310 | BACK LIGHT OFF |
| S311 | SET IN BACK LIGHT LIGHTING MODE |
| S312 | BACK LIGHT ON |
| S313 | FILE SPECIFICATION KEY OPERATED? |
| S314 | SPECIFY A FILE |
| S315 | SET FILE POINTER |

FIG. 3B

| S301 | BACK LIGHT ON REQUESTED? |
|---|---|
| S302 | DELAY TIMER 0? |
| S303 | BACK LIGHT ON |
| S304 | ANY KEY INPUT? |
| S305 | KEY INPUT TIMER 0? |
| S306 | BACK LIGHT OFF |
| S307 | BACK LIGHT SETTING KEY OPERATED? |
| S308 | LIGHTING OFF MODE? |
| S309 | SET IN BACK LIGHT TURNING OFF MODE |
| S310 | BACK LIGHT OFF |
| S311 | SET IN BACK LIGHT LIGHTING MODE |
| S312 | BACK LIGHT ON |
| S313 | FILE SPECIFICATION KEY OPERATED? |
| S314 | SPECIFY A FILE |
| S315 | SET FILE POINTER |

FIG. 4B

| S416 | FDD OPERATION EXECUTING KEY OPERATED? |
|---|---|
| S417 | FILE POINTER 0? |
| S418 | BACK LIGHT OFF |
| S419 | START FDD DRIVING |
| S420 | STORE OR READ OUT THE FILE SPECIFIED WITH FILE POINTER |
| S421 | DECREMENT FILE POINTER |
| S422 | STOP FDD DRIVING |
| S423 | BACK LIGHT LIGHTING MODE? |
| S424 | SET BACK LIGHT ON REQUEST |
| S425 | INITIALIZE DELAY TIMER |
| S426 | BACK LIGHT LIGHTING MODE? |
| S427 | BACK LIGHT ON |
| S428 | ANOTHER KEY PROCESSING |

DATA PROCESSING APPARATUS

This is a continuation of application Ser. No. 07/978,757 filed Nov. 19, 1992, now abandoned.

BACKGROUND OF THE INVENTION

1. Field of the Invention

The present invention relates to a data processing apparatus, such as a personal computer, a word processor and a typewriter, with edit functions.

2. Description of Related Art

A conventional data processing apparatus, such as the personal computer, the word processor and the typewriter, with edit functions, for example, a small-size portable word processor known as a note type, or a book type, comprises a key board, a liquid crystal display and floppy disk drives. These parts are compactly arranged in a main body. In recent years, in the data processing apparatus of the type mentioned, a transmission type liquid crystal display with a back light is provided enabling an operator to easily see the display on the liquid crystal display.

The above-mentioned small-size portable word processor can be operated on a commercial power supply with an AC adapter, and further, can be operated on batteries in place of the commercial power supply for a certain interval of time. Therefore, the word processor can be operated in any place without a commercial power supply. In the word processor comprising the above-mentioned liquid crystal display with the back light, the amount of electric power consumed is large when the back light is lit, more particularly, the amount of power consumed is very large when the back light is lit and simultaneously a floppy disk drive is driven. Therefore, in the conventional word processor, a power supply unit having a large-size and large-capacity is installed for dealing with the case when the back light is lit and simultaneously the floppy disk drive is driven.

Since the amount of electric power consumed is large when the back light is lit in the word processor, when key input operation is not executed in a predetermined interval of time, the back light is automatically turned off in order to save electric power in prior art devices. For example, this is proposed in Japanese Laid-Open Utility Model Publication No. 62-22630.

However, in this way, even if the back light is automatically turned off when key input operation is not executed in a predetermined interval of time, the amount of the electric power to be saved is small. Therefore, there is still a need to install a power supply unit having a large-size and large-capacity into the word processor in order to deal with the case that the back light is lit and simultaneously the floppy disk drive is driven.

Thus, in the conventional data processing apparatus having a liquid crystal display with the back light, a power supply unit having a large-size and large-capacity has to be installed. Therefore, the data processing apparatus can not be compact and lightweight, and the power supply unit is expensive.

SUMMARY OF THE INVENTION

The present invention has been designed for solving the various problems mentioned above, and it is an object of the present invention to provide a data processing apparatus having a liquid crystal display with a back light, wherein a power supply unit can be compact.

To achieve the above-mentioned and other objects, a data processing apparatus of the present invention comprising a liquid crystal display for displaying data, a back light for lighting the liquid crystal display from behind, and a disk drive for storing the data into memory medium and reading out the data from the memory medium, and a control means for turning off the back light while the disk drive is driven.

Moreover, to be more effective, after the disk drive is driven, the control means controls the back light such that the back light is lit while a predetermined interval of time elapses.

According to the present invention, since the control means controls the back light such that the back light is turned off while the disk drive is driven, the lighting operation of the back light and the driving operation of the disk drive are not simultaneously executed. Therefore, the amount of the electric power consumed is not large. Thus, a small-size and small-capacity power supply unit can be used for supplying enough power to operate the data processing apparatus.

Generally, data can not be input from the keyboard while the disk drive is driven. Therefore, even if the back light is turned off, there is no problem for an operator.

In addition, when some data files are continuously read out from a disk, the disk drive is driven at intervals with short stop periods. In the conventional data processing apparatus, the back light lights after the disk drive stops driving causing the back light to turn on and off, thereby distracting the operator with the dazzle of the liquid crystal display.

To solve the above-mentioned problem, after the driving operation of the disk drive is completed, the back light is controlled such that the back light lights after a lapse of a predetermined interval of time. Then, even if the disk drive is driven at intervals with short stop periods, the back light does not turn on and off, thereby the operator is not distracted with the dazzle of the liquid crystal display.

As described above, the data processing apparatus of the present invention comprises control means for controlling the back light such that the back light is turned off while the disk drive is driven. Therefore, in a data processing apparatus comprising a liquid crystal display with a back light and disk drive, the amount of electric power consumed is not large. Thus, a small-size and small-capacity power supply unit can be used for supplying enough power to operate the data processing apparatus.

Moreover, after the driving operation of the disk drive is completed, the back light is controlled so as to light after a lapse of a predetermined interval of time. Then, even if the disk drive is driven at intervals with short stop periods, the back light does not turn on and off, thereby the operator does not get distracted from the dazzle of the liquid crystal display.

BRIEF DESCRIPTION OF THE DRAWINGS

Preferred embodiments of the present invention will be described in detail with reference to the following figures wherein:

FIG. 3B is a table listing the steps of the flowchart of FIG. 3A;

FIG. 4B is a table listing the steps of the flowchart of FIG. 4A;

DETAILED DESCRIPTION OF PREFERRED EMBODIMENTS

Hereinafter, an embodiment which applies the present invention to a note type word processor will be explained with reference to FIGS. 1 through 5.

Figure 1:
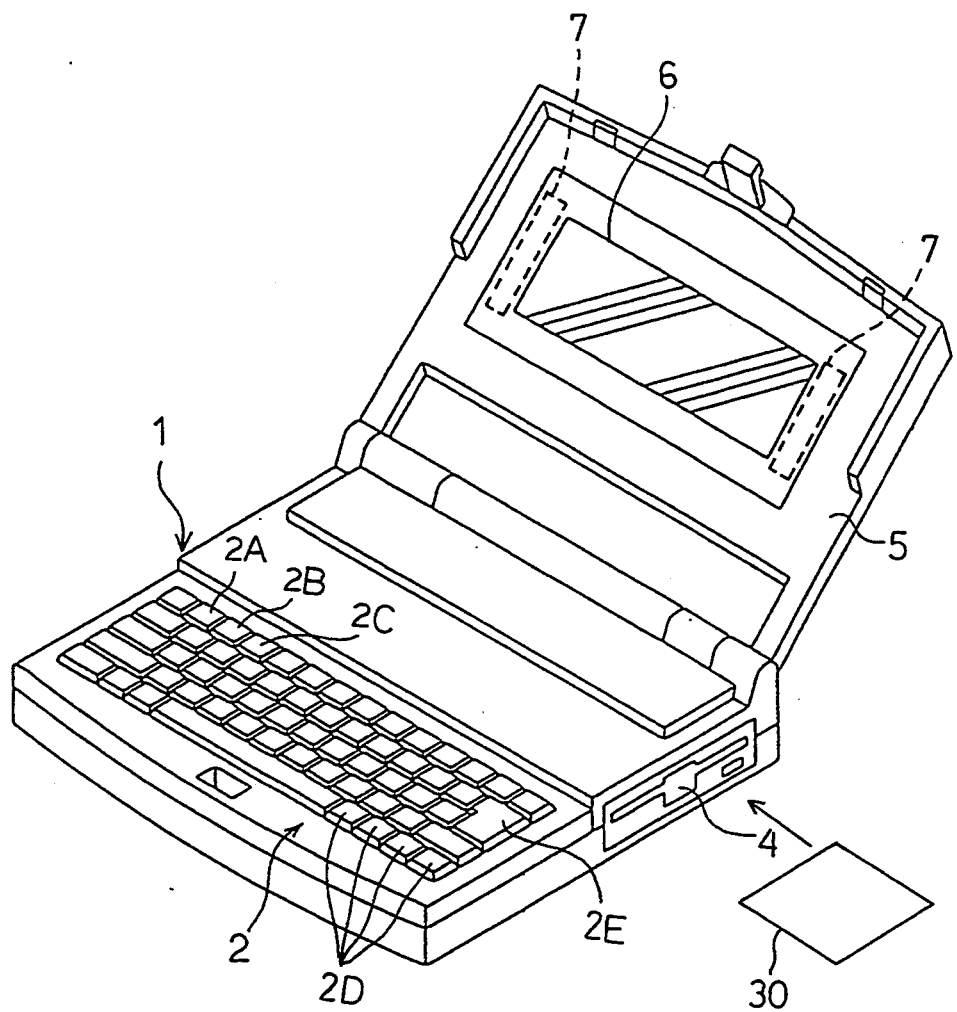
FIG. 1 is a perspective view of a note type word processor.
Figure 2:
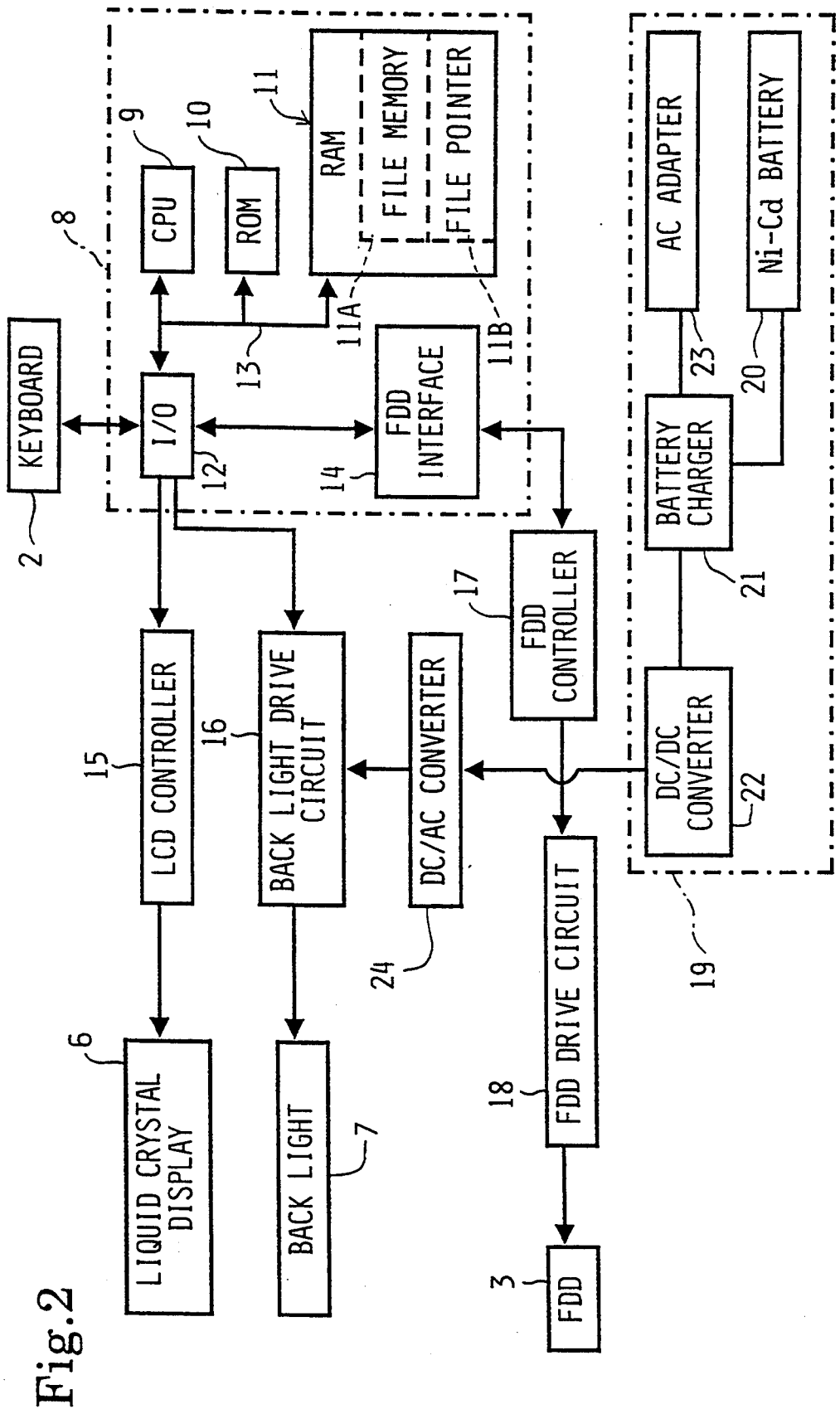
FIG. 2 is a block diagram for showing an electric construction of the note type word processor.

First, the construction of a note type word processor as the data processing apparatus of the present embodiment will be explained with reference to FIGS. 1 and 2. As shown in FIG. 1, the main body 1 of the note type word processor has a thin substantial rectangular shape and comprises a keyboard 2.

The keyboard 2 has a plurality of character keys and various function keys. An operator operates the keyboard 2 to input data of a document and execute various functions. In the note type word processor, the function keys comprise a back light setting key 2A for changing modes of lighting and turning off of the back light, a FDD operation executing key 2B for instructing a reading out operation and a storing operation of a data file in a floppy disk drive (FDD) to be described later, and a file specification key 2C for specifying the data file.

In the main body 1, a floppy disk drive 3 which functions as a disk drive is provided. As is generally known, the floppy disk drive 3 stores data files into a floppy disk 30 which functions as memory medium and reads out the data files from the floppy disk 30. The floppy disk 30 is inserted into the floppy disk drive 3 through an entrance 4 formed on one side of the main body 1.

A display 5 is pivotably provided on the main body 1. The display 5 comprises a liquid crystal display 6 and a back light 7 on the back of the liquid crystal display 6. The back light 7 is made of an electroluminescence (EL) panel shown schematically in phantom in FIG. 1 and is used for lighting the liquid crystal display 6 from behind. Alternatively, the back light 7 may comprise a flourescent light. When the operator operates the note type word processor, the display 5 is open for showing data on the display 5, and when the operator does not operate the note type word processor, the display 5 is laid down. Since the display 5 covers the upper surface of the keyboard 2, the main body 1 is stored in a thin substantial rectangular shape.

An operation control unit 8 made of mainly the microcomputer is provided in the main body 1. As shown in FIG. 2, the operation control unit 8 comprises CPU 9, ROM 10 for storing dictionary data and control programs, RAM 11 having a file memory 11A for storing files composed of inputted data and a file pointer 11B wherein the number of specified files is set, an I/O circuit 12 for controlling an output device, and bus 13 for connecting the I/O circuit 12 with the CPU 9, ROM 10 and RAM 11, respectively. Moreover, a FDD interface 14 is connected with the I/O circuit 12 in order to exchange the data with the floppy disk drive 3.

Also, the keyboard 2, a LCD controller 15 for controlling the liquid crystal display 6, and a back light drive circuit 16 for driving the back light 7 are connected with the I/O circuit 12, respectively. The operation control unit 8 executes a process of data making and data editing based on the inputted data from the keyboard 2 and controls the liquid crystal display 6 such that the liquid crystal display 6 displays the data.

The operation control unit 8 controls the back light 7 based on the back light setting key 2A such that the back light 7 lights or goes off. Therefore, when the operator does not need the lighting of the liquid crustal display 6, the operator selects the back light turning off mode by the key 2A. Then, the back light 7 is always turned off.

Further, the operation control unit 8 drives the floppy disk drive 3 through an FDD controller 17 and an FDD drive circuit 18. When an operator wants to store a file of data into the floppy disk 30 or read out the file from the floppy disk 30, the operator operates the file specification key 2C in order to display the file names on the liquid crystal display 6 and specifies a desired file. After this, when the operator operates the FDD operation executing key 2B, the specified file is stored into the floppy disk 30 or read out from the floppy disk 30.

In the present embodiment, some files can be stored in sequence in the floppy disk 30 or read out therefrom one at a time. For instance, when some files are read out from the floppy disk 30, the floppy disk drive 3 first reads out one file. Then, after a lapse of a predetermined interval of time, which is under one second, the floppy disk drive 3 reads out a next file. This operation is repeated until all specified files are read out.

Moreover, in the main body 1, a power supply unit 19 for supplying the electric power to each of the parts such as the back light 7 and the floppy disk drive 3 is provided. The power supply unit 19 comprises preferably a nickel-cadmium battery 20, a battery charger 21, and a DC/DC converter 22. The nickel-cadmium battery 20 supplies the electric power to each of the parts when the word processor is not connected to the commercial power supply. The battery charger 21 is used for charging the nickel-cadmium battery 20. Further, the word processor can be operated on the commercial power supply through an AC adapter 23. The AC power supply is supplied to the back light 7 through a DC/AC converter 24.

Owing to the software construction, even if in the back light lighting mode, the operation control unit 8 turns off the back light 7 while the floppy disk drive 3 is driven. However, if the back light 7 is set in the lighting mode, the back light 7 lights again after a lapse of a predetermined interval (ex. one second) from the time when floppy disk drive 3 stops driving.

The operation control unit 8 functions as the control means of the present invention. The processing for controlling the lighting and turning off mode of the back light 7 will be explained later with a flowchart. Moreover, in the present invention, if any key is not operated with the keyboard 2 in a predetermined time (ex. five minutes) in the lighting mode of the back light 7, the back light 7 is automatically turned off, and if any key is operated, the back light 7 lights. Therefore, electric power can be saved.

Figure 3A:
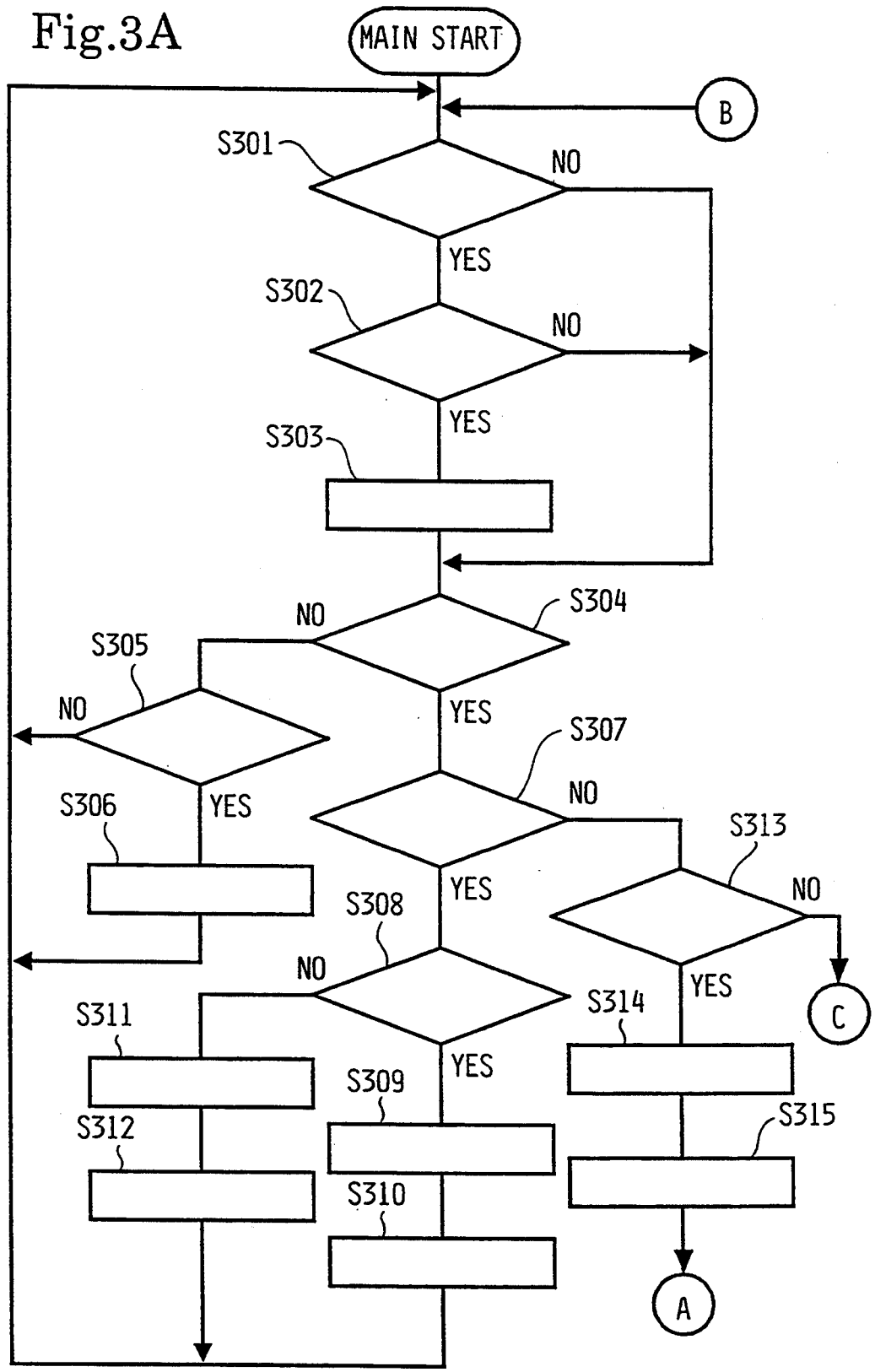
FIG. 3A is a flowchart for showing a process for controlling a back light of one embodiment of the present invention.
Figure 4A:
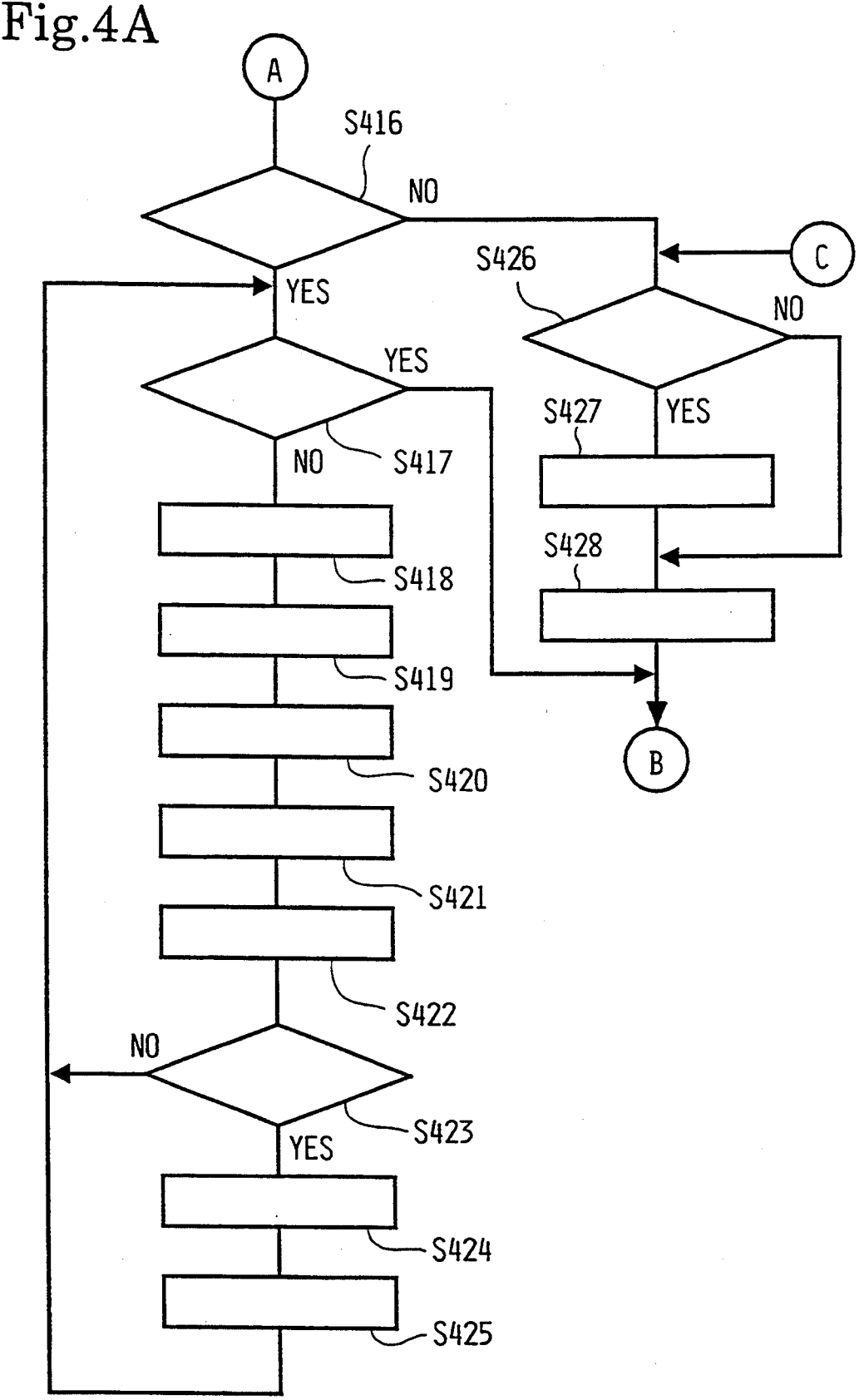
FIG. 4A is a flowchart continued from FIG. 3A for showing a process for controlling the back light.
Figure 5:
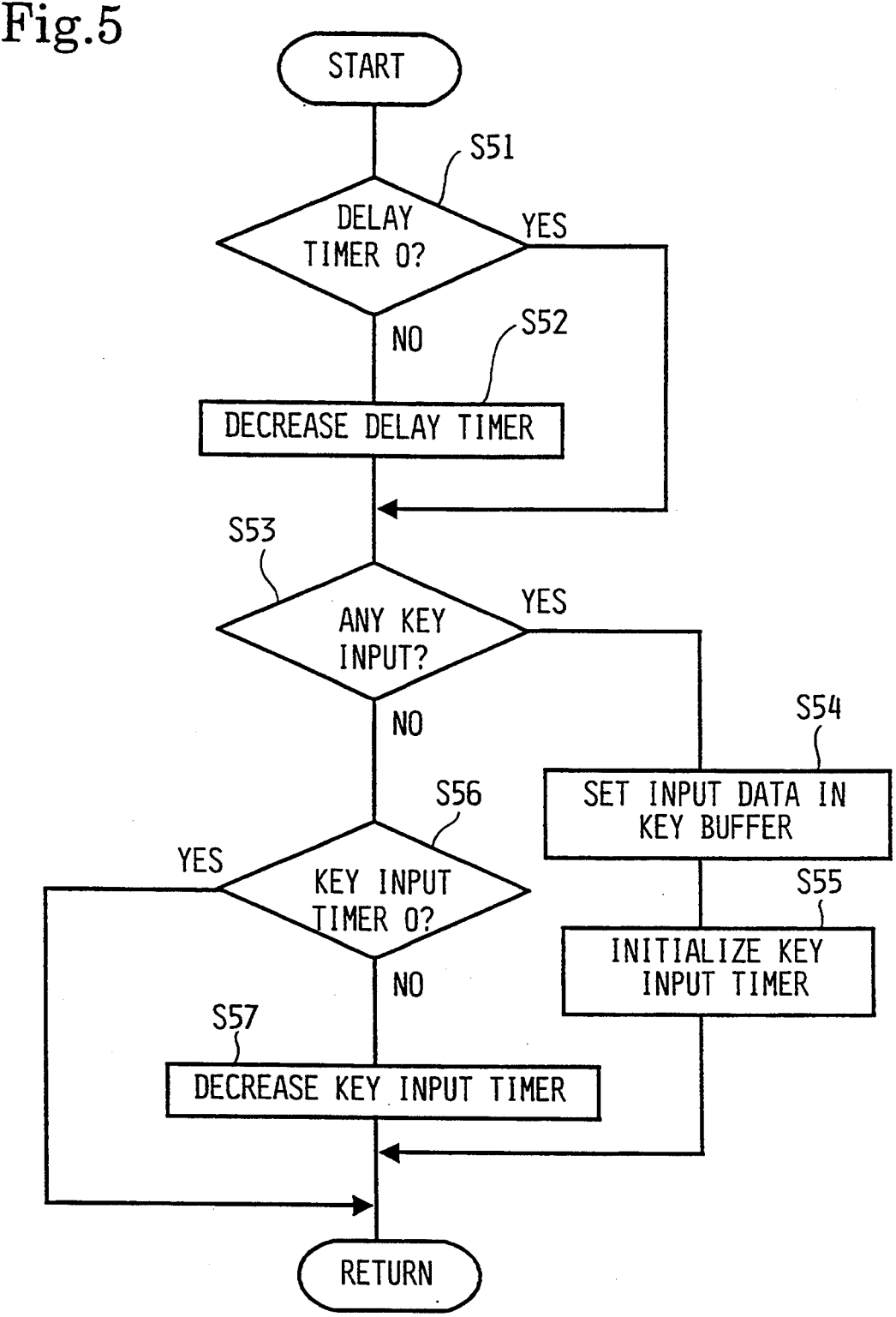
FIG. 5 is a flowchart for showing an interruption process.

Next, the operation of the above-mentioned construction will be explained with reference to FIGS. 3 through 5. Each flowchart of FIGS. 3A and 4A shows a main routine for controlling the lighting and turning off of the back light 7. FIG. 5 shows an interruption routine for operating a delay timer and a key input timer. The interruption operation is executed, for example, every 1 msec. A timer inside the CPU 9 functions as the delay timer and the key input timer.

First, the interruption routine of FIG. 5 will be explained. In step S51, the CPU 9 determines whether the delay timer is set at 0 or not. If the delay timer is not set at 0 (S51;No), the delay timer is decremented in step S52. The delay timer is used for timing the delay time. When the floppy disk drive 3 stops driving, the delay timer is set to be a value corresponding to one second by an initialization. After the initialization is executed, one second lapses. Then, the delay time is set to be 0.

Next, in step S53, the CPU 9 determines whether any key is input with the keyboard 2 or not. If any key is input (S53;Yes), the input data is set into a key buffer (step S54), and the key input timer is initialized in step S55. On the other hand, when the CPU 9 determines that any key is not input in step S53 (S53;No), the CPU 9 determines whether the key input timer is set at 0 or not in step S56. When the key input timer is not set at 0 (S56;No), the key input timer is decremented in step S57. The key input timer is used for determining whether any key is input in a predetermined time (five minutes). Every time any key is input, the key input timer is initialized so as to be set to be a value corresponding to five minutes. After this, when five minutes lapses, the key input timer is set to be 0.

Next, the main routine for controlling the back light 7 will be explained. One flowchart for explaining the main routine is divided into FIGS. 3A and 4A because of the length of the flowchart. FIGS. 3B and 4B are tables listing the steps of the flowchart of FIGS. 3A and 4A, respectively.

First, the power supply is applied to the main body 1 of the word processor, the CPU 9 determines whether the back light ON is requested or not in step S301. The request of the back light ON will be described below. When the back light ON is requested (S301;Yes) and the delay timer is 0 (S302;Yes), the back light 7 is lit in step S303, and the CPU 9 goes to step S304. When the back light ON is not requested (S301;No) or the delay timer is not 0 (S302;No), the CPU 9 goes to step S304.

In step S304, the CPU 9 determines whether any key is input with the keyboard 2. When any key is not input (S304;No), the CPU 9 determines whether the key input timer is 0 or not in step S305. At this time, when the key input timer is 0 (S305;Yes), the back light 7 is turned off in step S306 and the CPU 9 returns to step S301. When the key input timer is not 0 (S305;No), the CPU 9 returns to step S301. Thus, when any key is not input in five minutes, the back light 7 is automatically turned off in order to save the electric power.

When any key is input (S304;Yes), the CPU 9 determines whether the back light setting key 2A is operated or not in step S307. When the back light setting key 2A is operated (S307;Yes), the CPU 9 determines whether the turning off mode of the back light 7 is selected in step S308. When the turning off mode is selected (S308;Yes), the mode of the back light 7 is set in the turning off mode in step S309, and the back light 7 is turned off in step S310. When the lighting mode of the back light 7 is selected (S308;No), the mode of the back light 7 is set in the lighting mode in step S311, and the back light 7 is lit in step S312.

On the other hand, when the file specification key 2C is operated in order to store or read out data files (S307;No, S313;Yes), a file specificating process is executed in step S314. In the file specificating process, first, file names of files which are stored in the file memory 11A or the floppy disk 30 are read out and displayed on the liquid crystal display 6. Next, the operator operates cursor keys 2D such that a cursor positions on the desired file name. After this, the operator presses down an execution key 2E. Then, the file positioned with the cursor is specified. To specify a plurality of files, this operation is repeated. According to the file specificating process, the file pointer 11b is set in step S315. As described above, if a plurality of files are specified, these files are in sequence stored or read out. That is, the file pointer 11B is set to retrieve the number of the specified files. The file pointer 1ib is provided in the RAM 11.

When the FDD operation executing key 2B is operated (S416;Yes), the following process is executed. That is, first, the CPU 9 determines whether the file pointer is 0 or not in Step S417. When the file pointer is not 0 (S417;No), the back light 7 is turned off in step S418. The floppy disk drive 3 starts driving in step S419, and a file indicated in the file pointer is stored or read out in step S420.

When one file is stored or read out completely, the file pointer is decremented in step S421, and the floppy disk drive 3 stops driving in step S422. The CPU 9 determines whether the mode of the back light 7 is the lighting mode or not in step S423. When the mode of the back light 7 is the turning off mode (S423;No), the CPU 9 returns to step S417.

When the mode of the back light 7 is the lighting mode (S423;Yes), the back light ON is requested on step S424 and the delay timer is initialized in step S425. Then, the CPU 9 returns to step S417. When the file pointer is not 0 in step S417, the above-mentioned process is repeated until the file pointer becomes 0. When the file pointer is 0 (S417;Yes), the CPU 9 returns to step S301.

Thus, the back light 7 is turned off without fail while the floppy disk drive 3 is driven. Since the operator can not input the data or execute various processing while the floppy disk drive 3 is driven, the operator rarely uses the liquid crystal display 6. Therefore, even if the back light 7 is turned off, the operator does not have any trouble.

Moreover, in the lighting mode, after the floppy disk drive 3 stops driving and the delay time lapses, the back light 7 lights. Therefore, in the case that a plurality of files are stored in sequence or read out one at a time, the back light 7 does not turn on and off whenever the floppy disk drive 3 is driven. That is, after all files are completely stored or read out, the back light 7 lights.

When the file specification key 2C is not operated (S313;No), or the FDD operation executing key 2B is not operated (S416;No), the CPU 9 determines whether the mode of the back light 7 is the lighting mode or not in step S426. When the mode of the back light 7 is the lighting mode (S426;Yes), the back light 7 lights in step S427. After this, the other key processing is executed in step S428, and the CPU 9 returns to step S301.

As is apparent from the above explanation, according to the present embodiment, the operation control unit 8 controls the back light 7 such that the back light 7 is turned off while the floppy disk drive 3 is driven.

Therefore, the back light 7 does not light while the floppy disk drive 3 is driven.

Since the conventional word processor lights the back light and drives the floppy disk drive at the same time, a large amount of the electric power is consumed. However, according to the word processor of the present embodiment, the amount of the electric power consumed at one time is not large.

So, as compared with the conventional word processor comprising a power supply unit having a large-size and large-capacity, the word processor of the present embodiment can receive enough power for operation with a small-size and small-capacity power supply unit, thereby the cost can be reduced.

Further, in the present embodiment, just after the floppy disk drive stops driving, the back light does not light. After the floppy disk drive 3 stops driving and a predetermined delay time elapses, the back light 7 lights. Therefore, even if the floppy disk drive 3 is driven at intervals with short stop periods, the back light 7 does not turn on and off. So the operator is not dazzled with the liquid crystal display 6 and is not distracted.

Figure 6:
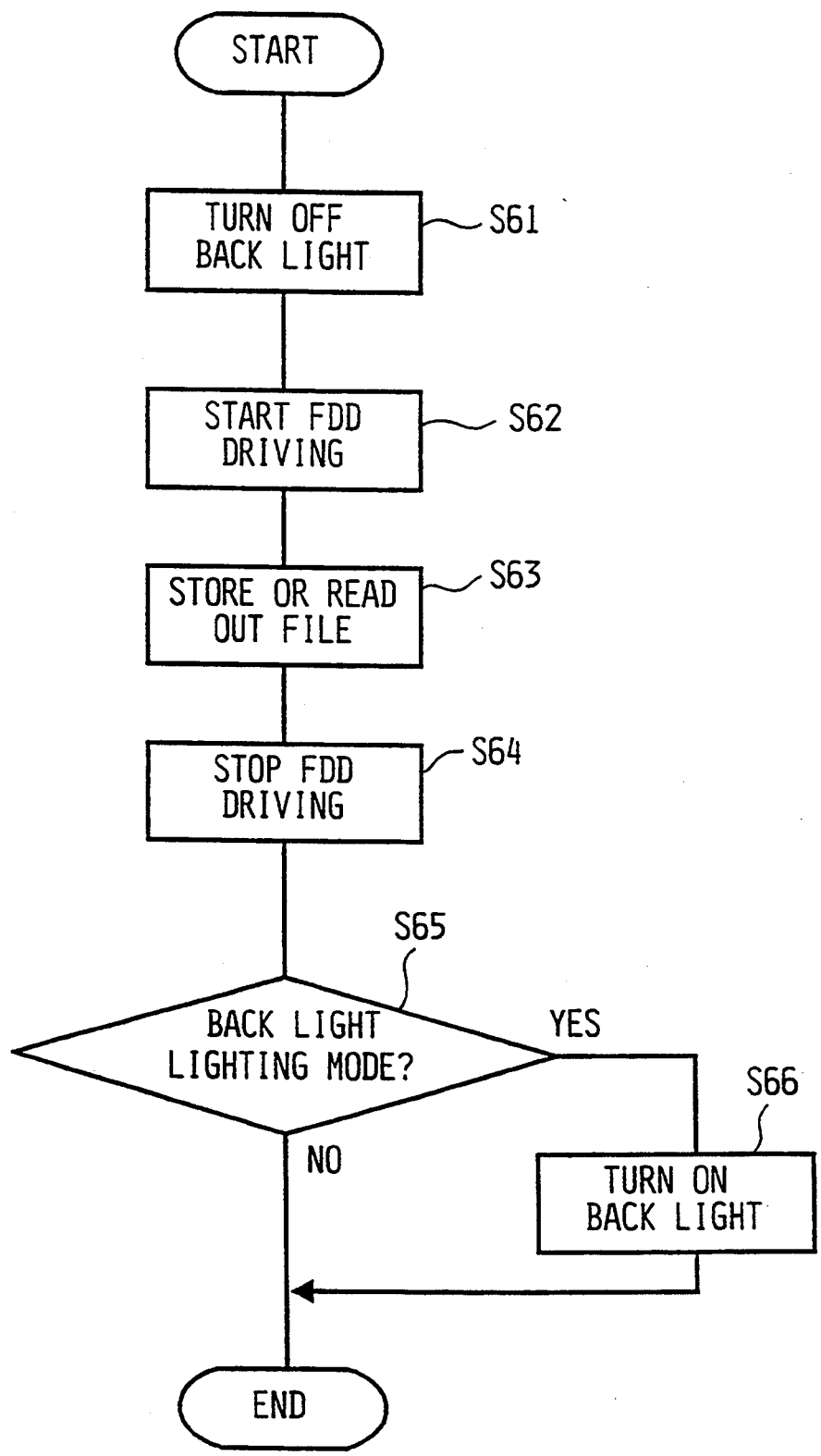
FIG. 6 is a flowchart for showing a process for controlling a back light in an another embodiment of the present invention.

FIG. 6 shows an another embodiment of the present invention and is a flowchart of the process for driving the floppy disk drive 3. This embodiment is different from the above-mentioned embodiment in the following. In the word processor of the embodiment of FIG. 6, the delay time is not provided. That is, when the driving process of the floppy disk drive 3 is executed, the back light is turned off in step S61. The floppy disk drive 3 starts driving in step S62, and a file is stored or read out in step S63.

After this, when the file is stored or read out completely, the floppy disk drive 3 stops driving in step S64. The CPU 9 determines whether the mode of the back light 7 is the lighting mode or not in step S65. When the mode of the back light 7 is the lighting mode (S65;Yes), the back light 7 lights in step S66.

As mentioned above, the back light 7 is turned off without fail while the floppy disk drive 3 is driven. Therefore, the amount of electric power to be consumed at one time is not large. Since the word processor can get enough power with a small-size and small-capacity power supply unit, the word processor is light-weight and a compact size, thereby the cost can be reduced.

This invention is not limited to the above mentioned embodiments. It should be understood that many changes and modifications may be made in the embodiments without departing from the scope of the present invention. For instance, a hard disk drive and an optical disk drive may be used in place of the floppy disk drive 3 as the disk drive. Moreover, the present invention can be applied to not only a note type word processor but also a personal computer and a typewriter with edit functions.

What is claimed is:

1. A data processing apparatus comprising:
    input means for inputting data;
    memory means for storing the input data;
    display means for displaying the data;
    lighting means for lighting said display means;
    disk drive means for storing the input data into said memory means and for reading out data stored in said memory means;
    control means for controlling said lighting means by automatically turning said lighting means off when said disk drive means begins operating and keeping said lighting means off during a timed delay after said disk drive means stops operating; and
    delay means for automatically turning said lighting means on after the timed delay elapses after said disk drive means stops operating thereby preventing said lighting means from turning on and off when said disk drive means stops operating for short intervals, said delay means comprising a timer means for timing the timed delay after said disk drive means finishes an individual storing or reading operation.

2. The data processing apparatus as in claim 1 wherein said display means comprises a liquid crystal display.

3. The data processing apparatus as in claim 2 wherein said lighting means comprises a backlight for lighting said liquid crystal display from behind.

4. The data processing apparatus as in claim 1 wherein said input means includes mode selecting means for selecting a lighting on and off mode.

5. The data processing apparatus as in claim 4 wherein said control means comprises:
    lighting determining means for determining which lighting mode has been selected;
    drive determining means for determining whether said disk drive is being operated; and
    operating means for turning off said lighting means if the lighting on mode has been selected and if said disk drive means is operating.

6. The data processing apparatus as claim 1 further comprising input determining means for determining whether said input means has been operated in a predetermined period of time and for turning said lighting means off when said input means has not been operated in said predetermined period.

7. The data processing apparatus as in claim 6 further comprising a key input timer for timing the period after said input means has been operated.

8. The data processing apparatus as in claim 1 further comprising data specificating means for selecting and retrieving stored data from data displayed on said display means.

9. A data processing apparatus comprising:
    a removable battery power source;
    an input that inputs data;
    a memory that stores the input data;
    display that displays the data;
    a back light that lights said display coupled to said removable battery power source;
    a disk drive that stores the input data into said memory and reads out data stored in said memory coupled to said removable battery power source;
    a controller coupled to said back light and said disk drive, said controller turning said back light off while said disk drive is operating and during a predetermined delay after said disk drive stops operating to conserve power by preventing the back light and the disk drive from operating simultaneously; and
    a delay mechanism comprising a timer coupled to said controller that turns said back light on after the predetermined delay elapses after said disk drive stops operating thereby preventing said back light from turning on and off when said disk drive stops operating for short intervals.

10. The data processing apparatus as in claim 9 wherein said controller includes a drive determiner that determines whether said disk drive is being operated; and an operator that turns off said back light when said disk drive is operating.

11. The data processing apparatus as in claim 9 wherein said display comprises a liquid crystal display and said back light lights said liquid crystal display from behind.

12. The data processing apparatus as in claim 9 further comprising an input determiner that determines whether said input has been operated in a predetermined period of time and that turns said back light off when said input means has not been operated in said predetermined period.

13. The data processing apparatus as in claim 9 further comprising a data specificator that selects and retrieves stored data from data displayed on said display.

14. A method for controlling a back light in a display of a data processing apparatus comprising the steps of:
inputting data into the data processing apparatus;
storing input data in a memory;
displaying data on a display;
lighting the display with a light;
operating a disk drive to read out data stored in the memory or store data into the memory;
controlling the light by automatically turning the light off while the disk drive is reading or storing data and keeping the light off during a predetermined delay as determined by a timer after the disk drive stops operating to prevent the light from turning on and off when the disk drive stops operating for short intervals; and
turning the light on after the predetermined delay after the disk drive stops operating.

15. The method of claim 14 further comprising turning the light off when data has not been input in a predetermined period of time.

16. The method of claim 14 further comprising the step of selecting an on or off mode for the light.

17. The method of claim 16 further comprising the step of determining whether the on or the off mode has been selected.

18. The method of claim 14 further comprising the steps of selecting and retrieving stored data from data displayed on the display.

* * * * *